Figure 1:
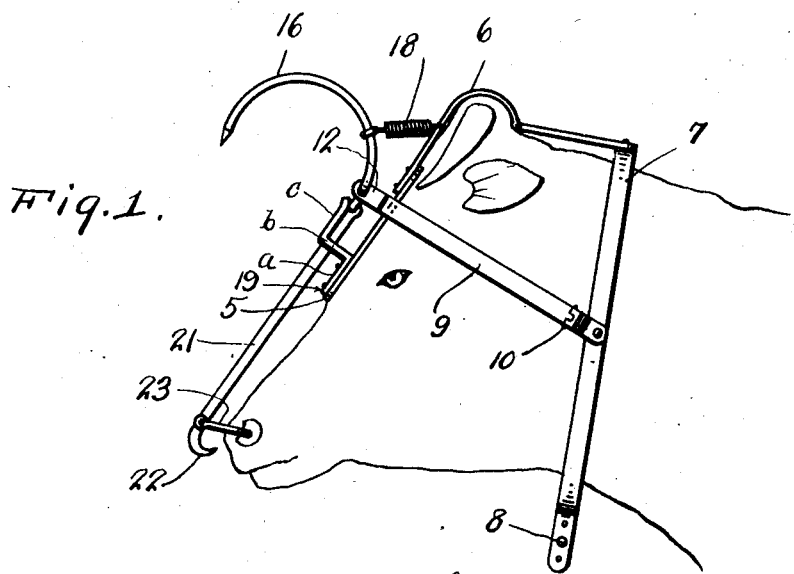

March 12, 1929.  A. L. JONES  1,705,220

ANTIGORING DEVICE FOR BULLS

Filed Dec. 21, 1927  2 Sheets-Sheet 1

Inventor
Alfred L. Jones
By Clarence A.O'Brien
Attorney

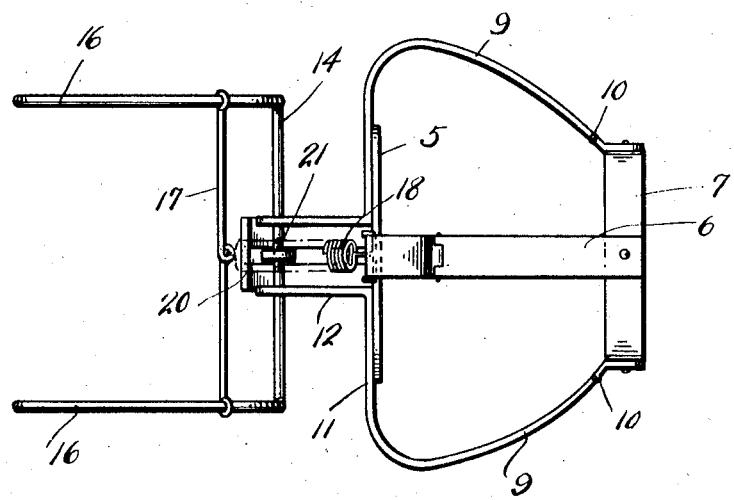
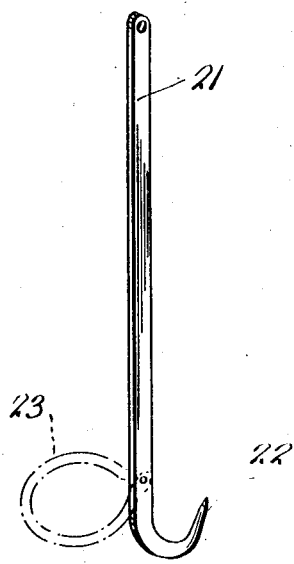
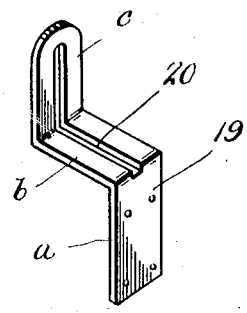
Inventor
Alfred L. Jones

Patented Mar. 12, 1929.

1,705,220

UNITED STATES PATENT OFFICE.

ALFRED L. JONES, OF GREEN CITY, MISSOURI.

ANTIGORING DEVICE FOR BULLS.

Application filed December 21, 1927. Serial No. 241,599.

The present invention relates to a device for placement on the heads of bulls and like cattle to prevent them from goring persons or other animals and has for its prime object to provide a very effective structure which will inflict great pain to the animal if any attempt is made to gore persons or animals and which will tend to teach the cattle not to gore.

A still further important object of the invention resides in the provision of an antigoring apparatus of this nature which is simple in its construction, strong and durable, inexpensive to manufacture, thoroughly efficient and reliable in use, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

Figure 2:
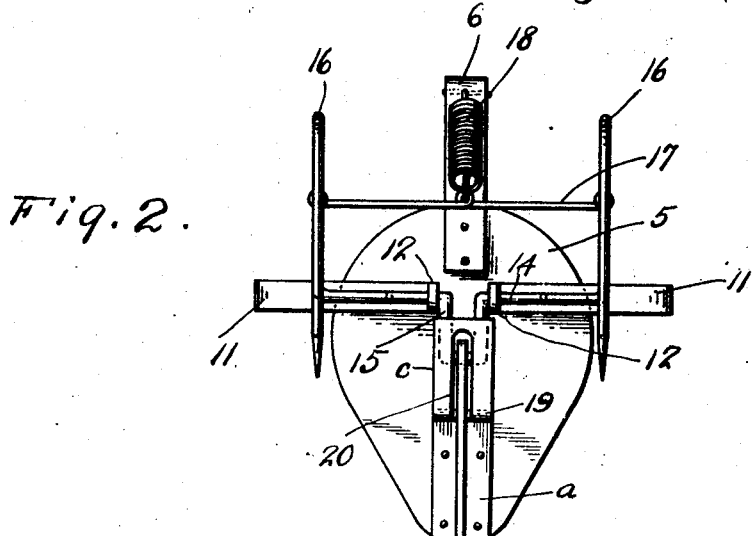

In the drawing:

Figure 1 is a side elevation of the apparatus showing the same on the end of an animal, Figure 2 is a front elevation thereof, Figure 3 is a top plan view thereof, Figure 4 is a detail perspective view of the nose pricking member, and Figure 5 is a detail perspective view of the guide bracket.

Referring to the drawing in detail it will be seen that the numeral 5 denotes the forehead plate which has fixed thereto a strap that extends upwardly therefrom and is curved over the top of the head of the animal and then extends rearwardly as indicated by the numeral 6. A neck yoke 7 is secured to the rear extremity of the arm 6 and disposed about the animal's neck being securely held in place as at 8 by suitable means. Side arms 9 are secured to the forehead plate 5 and extend rearwardly to the sides of the animal's head between the eyes and ears thereof and are hingedly connected as at 10 with the yoke 7. These arms 9 have inwardly directed forward end extensions 11 that are secured to the front face of the plate 5 and terminate in forwardly extending ears 12. A shaft 14 is journaled through the ears 12 and between the ears is provided with a crank portion 15. The outer ends of the shaft 14 merge into curved piercing elements 16 the ends of which are pointed and directed downwardly. These piercing members 16 are connected by a rod 17 with which is engaged a spring 18 also engaged with the arm 6 so as to normally hold the piercing members 16 in an outwardly and upwardly disposed position. A guide and stop bracket 19 comprises a plate *a* anchored to the bottom portion of the plate 5, and outwardly disposed portion *b* perpendicular to the plate portion *a* and terminating in an upwardly disposed portion *c*. The portions *b* and *c* have a slot 20 formed therein. An elongated shank 21 has a lower end thereof hooked upwardly as at 22 terminating in a piercing point. The nose ring 23 is pivotally engaged with the lower portion of the shank and extends through the nose of the animal with the point of the hooked end 22 pointed toward the animal's nose. The upper end of the shank extends through the slot 20 and is engaged on the shank 15.

From the description of the parts just given it will be seen that should the animal attempt to gore anyone or anything, the members 16 will be swung toward the face of the animal and pierce it and at the same time cause the rotation of the shaft 14 and the swinging of the shank 15 inwardly so as to move upwardly on the shank 21 and its piercing hooked end 22 so as to bring this end in engagement with the animal's nose. Obviously this will inflict a great pain to the animal and soon break him of the goring habit. The device is not apt to do any great harm to the animal because as soon as it is placed on him he will naturally attempt to get the same off by rubbing it against the fences or the like and he will soon learn the effect of the goring habit upon the apparatus.

It is thought that the construction, operation and advantages of this invention will now be clearly understood without a more detailed description thereof.

The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. An apparatus of the class described comprising a plate, means for holding the plate on the forehead of an animal, a shaft, means for journalling the shaft on the plate, the intermediate portion of the shaft being provided with a crank, piercing arms extending from the extremities of the shaft upwardly therefrom and then curved downwardly terminating in points, an elongated shank engaged on the crank and having an upturned pointed hooked end, and a nose engaging ring pivotally engaged with the lower portion of the shank.

2. An apparatus of the class described comprising a plate, means for holding the plate on the forehead of an animal, a shaft, means for journalling the shaft on the plate, the intermediate portion of the shaft being provided with a crank, piercing arms extending from the extremities of the shaft upwardly therefrom and then curved downwardly terminating in points, an elongated shank engaged on the crank and having an upturned pointed hooked end, and a nose engaging ring pivotally engaged with the lower portion of the shank, spring means for normally holding the arms upwardly.

3. An apparatus of the class described comprising a plate, means for holding the plate on the forehead of an animal, a shaft, means for journalling the shaft on the plate, the intermediate portion of the shaft being provided with a crank, piercing arms extending from the extremities of the shaft upwardly therefrom and then curved downwardly terminating in points, an elongated shank engaged on the crank and having an upturned pointed hooked end, and a nose engaging ring pivotally engaged with the lower portion of the shank, a rod connecting the arms, a spring engaged with the rod and means mounting the spring so as to hold the rod upwardly with the arms.

4. An apparatus of the class described comprising a plate, means for holding the plate on the forehead of an animal, a shaft, means for journalling the shaft on the plate, the intermediate portion of the shaft being provided with a crank, piercing arms extending from the extremities of the shaft upwardly therefrom and then curved downwardly terminating in points, an elongated shank engaged on the crank and having an upturned pointed hooked end, and a nose engaging ring pivotally engaged with the lower portion of the shank, a bracket having an elongated slot through which the shank extends, said bracket being disposed to limit the outward swing of the crank.

5. An apparatus of the class described comprising a plate, means for holding the plate on the forehead of an animal, a shaft, means for journalling the shaft on the plate, the intermediate portion of the shaft being provided with a crank, piercing arms extending from the extremities of the shaft upwardly therefrom and then curved downwardly terminating in points, an elongated shank engaged on the crank and having an upturned pointed hooked end, and a nose engaging ring pivotally engaged with the lower portion of the shank, a bracket having an elongated slot through which the shank extends, said bracket being disposed to limit the outward swing of the crank, spring means associated with the arm for holding them upwardly and the crank abutting the bracket.

In testimony whereof I affix my signature.

ALFRED L. JONES.